[Patent]

3,652,744
Patented Mar. 28, 1972

3,652,744
METHOD OF MAKING NUCLEAR
FUEL ELEMENTS
Richard C. Dahlberg, La Jolla, and Walter V. Goeddel, San Diego, Calif., assignors to the United States of America as represented by the United States Atomic Energy Commission
No Drawing. Filed Nov. 19, 1969, Ser. No. 878,198
Int. Cl. G21c 21/02
U.S. Cl. 264—.5     3 Claims

ABSTRACT OF THE DISCLOSURE

Nuclear fuel elements which contain different amounts of nuclear fuel in the form of minute particulate nuclear fuel cores having fission product-retentive coatings are made using casings which have the same amount of fuel chamber volume for holding the nuclear fuel. First and second groups of coated fuel particles are used which vary from each other either in core composition, core size, or coating thickness and thereby contain different amounts of nuclear fuel per unit volume of coated particles. Thus, different fuel elements contain different amounts of nuclear fuel as a result of containing different relative amounts of coated nuclear fuel particles from the first and second groups.

---

This invention relates to nuclear fuel elements and more particularly to methods for making nuclear fuel elements and to nuclear reactor cores fueled with such nuclear fuel elements.

It has been recognized for some time that fuel zoning might be desirable for the cores of nuclear reactors because, inherently in any unit volume constituting a reactor core, the neutron flux tends to be higher in the spacial center of the unit volume and to be lower near the periphery of the unit volume. Accordingly, it may be desirable to employ fuel elements having a lower loading of nuclear fuel material near the center of the reactor and fuel elements having higher loadings of nuclear fuel material in the peripheral regions of the reactor core. Of course, in any nuclear reactor, it is desirable that the fuel element design be as uniform as possible to facilitate the production thereof and to facilitate the possible interchanging of fuel elements within the reactor core. Accordingly, improvements in fuel element design and manufacture consistent with the foregoing objectives are always desired.

It is an object of the present invention to provide an improved method of making nuclear fuel elements having variable fuel loadings. Another object of the invention is to provide an improved method for making nuclear fuel compacts of a standard shape and form having variable nuclear fuel loadings. A further object is to provide a method for making fuel elements for use in a reactor core which nuclear fuel elements are of a standardized design but have different nuclear fuel loadings in fuel chambers of the same unit volume. These and other objects of the invention should be apparent from a reading of the following detailed description of methods for making nuclear fuel elements embodying various features of the invention.

It has been found that the manufacture of fuel elements with variable nuclear fuel loadings can be accomplished using fuel element body casings having fuel chambers of uniform design. The variation in fuel loading of the individual fuel elements is accomplished via the use of particulate fuel and by variation in the nuclear content of the particulate fuel with which each of the fuel chambers is filled. Generally, it is desirable to minimize the entry of radioactive fission products into the reactor coolant stream, and particulate nuclear fuel is employed which incorporates individual fission product-retentive coatings. It has been found that nuclear fuel elements of varying fuel loading can be conveniently manufactured by employing at least two different groups of coated nuclear fuel particles, each group having a different nuclear fuel loading per unit volume.

The difference in the groups may be one of core size, coating thickness, or core composition, e.g., density of the nuclear fuel material. It is contemplated that such differences would usually be accomplished either by varying core size or coating thickness as these are most easily controlled from a production standpoint. As one example, one might take two groups of nuclear fuel cores having the same average particle size and apply thereto fission product-retentive coatings of significantly different thicknesses so that the particles of one group although containing nuclear fuel cores of substantially the same size and composition as the other group would be significantly larger in overall size because of the thicker coatings applied thereto. Depending upon the particular nuclear fuel loading which is desired for a certain fuel element, it is simple to calculate the relative percentages of coated fuel particles from the two groups which should be employed in order to fill the desired fuel chamber volume with the desired nuclear fuel loading.

As another example, it might be desirable to use nucelar fuel cores of the same fuel composition and to separate them into two groups which have substantially different average core sizes. These two groups are then both coated with fission product retentive coatings of the same thickness. Because of the original disparity in the size of the fuel cores, two groups of coated fuel particles result having different loading density of nuclear fuel metal. By selecting the proper relative proportions of the two groups of coated fuel particles, a resultant fuel loading can be accomplished anywhere between the loading densities of the particles of either individual group.

As used herein, the term nuclear fuel is employed to refer to both fissile materials, such as uranium-233, uranium-235, plutonium-239 and compounds thereof, and to fertile materials, such as thorium-232, uranium-238 and compounds thereof. Depending upon the specific reactor wherein the nuclear fuel elements are to be employed, the fuel may consist completely of fissile particles or may be a mixture of fissile and fertile particles, as is often the case. For example, nuclear reactors operating in the thermal neutron energy range which employ uranium dicarbide as the fissile material may employ thorium dicarbide as a fertile material.

In accordance with the principles set forth in U.S. Pat. No. 3,208,912, issued Sept. 28, 1965 to Seymour Jaye and Dana H. Lee, Jr., it may be desirable to employ the fissile and fertile materials as separable particles so as to facilitate the chemical reprocessing of the fertile particles separately from the chemical reprocessing of the fissile particles after the fuel particles have served their desired fuel lifetimes. In such a case, individual fertile particles made entirely of thorium dicarbide might be employed. However, there are nuclear reasons why it might not be desirable to use dense particles of uranium dicarbide as the fissile particles. In this respect, porous uranium dicarbide particles might be used or thorium dicarbide or some other high temperature stable compound might be employed as a diluent with the uranium dicarbide in the fertile cores in order to avoid very high fissile concentrations in individual fuel particles.

Nuclear reactors which employ such coated particulate nuclear fuel generally use particles which are less than about 1000 microns in particle size and which are generally spheroidal in shape. The coating surrounding each individual fuel core serves as an individual pressure vessel which is designed to retain therewithin the gaseous fission products that are generated during the lifetime of the nuclear fuel material in the reactor for which it is destined. Various coatings for nuclear fuel particles have been developed. Examples of such fuel particle coatings are set forth in United States Letters Patent No. 3,335,063, issued Aug. 8, 1967, in the names of Walter V. Goeddel, Charles S. Luby and Jack Chin and in United States Letters Patent No. 3,298,921, issued Jan. 17, 1967, in the names of Jack C. Bokros, Walter V. Goeddel, Jack Chin and Robert J. Price.

One example of a coated fuel particle disclosed in the last-mentioned patent comprises a nuclear fuel core that is surrounded by an inner layer of spongy, porous pyrolytic carbon about which an outer layer of more dense isotropic pyrolytic carbon is disposed. Refractory metal carbide layers, such as silicon carbide and niobium carbide, may also be employed as additional fission product barriers if desired for specific reactor applications.

There are many different fuel element designs which may be employed depending upon the particular reactor of interest. For example, elongated fuel elements, such as those disclosed in U.S. Pat. 3,274,068, which are made up of a plurality of interconnected body sections might be used. Another example of a fuel element is that illustrated in U.S. Pat. 3,413,196 which is in the form of a hexagonal-shaped graphite block containing a plurality of axially extending coolant passageways and fuel chambers. Such a fuel element might, for example, stand about thirty inches high and measure about fourteen inches across the flats. A fuel element of these dimensions might contain over 200 cylindrical fuel chambers each having diameters of about one-half inch.

Depending upon the criteria for the reactor wherein the fuel elements are to be used, the fuel chambers may be filled with a packed bed of nuclear fuel particles or may be filled with a fuel compact made from coated nuclear fuel particles. If a fuel compact is used, the particles are bonded together with a suitable binder which is compatible with the fuel particle coatings and with the material from which the fuel element casing is made. For example, pitch, phenol-formaldehyde resins, furfural alcohol resins, and other resins which carbonize may be used as binders. The fuel compacts may be formed in situ in the fuel chambers of the fuel element if desired. However, to facilitate production, it is often desirable to form the fuel compacts in separate molds and then insert the fuel compacts in the fuel chambers of the fuel elements.

A non-volatile carbonaceous filler may also be incorporated with the binders to improve the structural strength of the porous carbon matrix that results after carbonization of the resin. Preferred filler materials are graphite powder and activated carbon or charcoal. Activated carbon has the advantage of also improving the retention of heavy metal fission products within the fuel compact.

Such a fuel compact may be fabricated by mixing the coated fuel particles with the binder and a suitable catalyst, if a catalyst is employed, and then filling a mold with the combined mixture. On the other hand, there are advantages to first filling the molds with the coated fuel particles to the desired loading density and then injecting a liquid resin-curing agent-filler mixture into the mold. The latter method may be preferred from the standpoint of being able to pack the mold to the desired density of coated particles in the absence of the binder mixture.

As previously indicated, coated nuclear fuel particles are generally employed which are less than about 1000 microns in particle size and which are preferably spheroidal in shape. If only fissile particles are employed in the fuel elements, such as for example uranium oxide particles, then at least two groups of coated uranium oxide particles are prepared each having different percentage amounts of uranium metal per unit volume. It should be understood that three or more groups of coated fuel particles might be used if desired to achieve some production advantage; however, to avoid complicating the explanation the discussion hereinafter is restricted to the use of two groups.

As previously mentioned, the two groups of coated nuclear fuel particles of different fuel loadings might be established in different ways. In one instance, the uranium dioxide fuel cores might be produced in a manner to provide two different groups of different particle size. In order to provide a significantly large range of fuel loadings, the two groups of fuel cores may well be sized so that fuel cores of one group have an average volume as much as 50 percent or more greater than the volume of the cores of the second group. By using such groups of fuel cores of different size, fission product-retentive coatings of the same thickness can be applied to the cores of both groups because, as a result of the original disparity in size of the cores, the resultant coated fuel particles will have the desired disparity in nuclear fuel metal loading per unit volume.

The desired disparity in fuel loading of the coated fuel particles can also be created by the coating operations. Uranium dioxide cores of the same average particle size may all be coated, for example, with a first layer of spongy pyrolytic carbon about 50 microns thick. Thereafter, half of the coated cores may be coated with a second layer of more dense isotropic pyrolytic carbon about 50 microns thick while the remainder of the coated cores are coated with 100 micron thick layer of this isotropic pyrolytic carbon. The resultant coated particles will have a disparity in diameter of an average of about 100 microns which produces a significant disparity in nuclear fuel metal loading per unit volume. Accordingly, when fuel cores of the same average size are employed, the thickness of the fission product-retentive coatings of the one group of coated particles may be as much as 50 percent greater than the thickness of the fission product-retentive coatings of the other group of particles.

When oxide cores are coated with pyrolytic carbon, it may be desirable to dispose a thin, for example 5 microns thick, coating of dense pyrolytic carbon as a seal layer immediately exterior of the buffer layer, as is known in the art, to prevent a chemical reaction between the uranium dioxide and the carbon should higher temperatures be used to apply subsequent coatings.

When both fissile and fertile particles are employed in the fuel elements, as in accordance with the teachings of the aforementioned U.S. Pat. 3,208,912, although both the fertile particles and the fissile particles might be employed in the form of different groups having varying nuclear fuel metal loadings, the desired disparity in fuel element loading can be obtained by varying the loading of only one group. In many instances, the fissile particles are employed in a form that is uniform, while the physical characteristics of the fertile particles are varied to create the resultant disparity in nuclear fuel loading. Similarly, fertile particles of a uniform design could be employed and the physical characteristics of the fissile particles varied to create the disparity in fuel loading while still filling the intended volume of the fuel chambers so as to provide the uniform distribution of fuel within the individual fuel elements as desired.

To accomplish fuel zoning in a nuclear reactor core wherein the hexagonal type fuel element casings described hereinbefore are employed, the fuel elements destined to be employed near the spacial center of the nuclear reactor core might have a uranium metal loading (using 93 percent enriched uranium) of about 0.03 gram of uranium per cm.$^3$ of fuel chamber volume. On the other hand, the fuel elements employed near the periphery of the nuclear reactor core might utilize fuel compacts having a uranium loading of about 0.06 gram of uranium per cm.$^3$.

The following example further illustrates various features of the present invention but it is in no way intended to limit the scope thereof.

EXAMPLE

Hexagonal block fuel element casings are fabricated from blocks of graphite having a density between about 1.7 and 1.8 grams per cm.³. The height of the blocks is about thirty inches and the horizontal cross-section through the blocks is that of a regular hexagon measuring about fourteen inches across the flats. Each of the fuel element casings contains about 100 coolant holes and about 200 fuel chambers. The fuel chambers are in the form of circular holes about 0.5 inch in diameter and are formed by drilling downward from the top end face of the casing to about one-quarter inch from the bottom of the block. One reactor design employs about 247 columns of these blocks stacked one atop another and disposed in a side-by-side array with a total of nearly 1500 fuel elements to form the reactor core.

Fuel compacts for each of the fuel element casings are formed separately in molds having a diameter just slightly less than that of the fuel chambers. The height of the fuel compacts is such that they extend within about 0.5 inch of the top of the fuel chamber and a flat plug of graphite is inserted into the top above each fuel compact.

The zone loading requirements for fuel elements to be disposed in the interior of the reactor core specify fissile material in the form of enriched uranium in an amount of 0.03 gram per cubic centimeter of fuel chamber volume. Fertile thorium metal is desired in an amount of 0.6 gram per cubic centimeter of fuel chamber volume. Another group of fuel elements which are destined for disposition near the periphery of the reactor core have a design requirement for fissile uranium in an amount of 0.06 gram per cubic centimeter of fuel chamber volume and fetrile thorium in an amount of 0.9 gram per cubic centimeter of fuel chamber volume.

It is desirable to employ the fissile uranium in the form of uranium dicarbide which has a content of about 8 grams of uranium metal per cubic centimeter of $UC_2$. It is decided to employ the fissile material in the form of such uranium dicarbide spheroids about 100 microns in diameter. Using such spheroids having about 8 grams of uranium metal per cubic centimeter, the fissile loading of the interior fuel elements requires 0.00375 cm.³ of such uranium cores for each cubic centimeter of fuel chamber volume.

A 100 micron-thick fission product-retentive coating is applied to the 100 micron diameter uranium carbide cores to provide coated fissile particles which are 300 microns in diameter. The threefold increase in diameter (100 microns to 300 microns) increases the volume twenty-seven times. Accordingly, the requirement is such that the coated uranium dicarbide particles should occupy 0.101 cm.³ of each cubic centimeter of fuel chamber volume. Particles in this general size range exhibit a particle packing fraction of about 0.6 (60 percent). Substracting the 0.101 cm.³ from the 0.6 cm.³ of volume that will be occupied by the solid spheroids, it is calculated that the fertile particles should occupy 0.499 cm.³ of each cubic centimeter of fuel chamber volume if the fuel chambers are to be uniformly filled with a dispersion of fissile and fertile particles.

The thorium dicarbide to be employed also has a metal content of about 8 grams of thorium per cubic centimeter of $ThC_2$. Thus, the desired level of thorium (0.6 gram per cm.³ of fuel chamber volume) is equal to 0.075 cm.³ of thorium dicarbide cores per cm.³ of the fuel chamber volume. Thorium dicarbide spheroids about 400 microns in diameter are used. Knowing that 0.075 cm.³ of thorium dicarbide cores should form coated particles that will occupy 0.499 cubic centimeter of volume, the coating thickness which should be applied to the cores is calculated, and it is found to be about 175 microns. (An increase in volume of about 6.67 times is required which calculates to a needed increase in radius of 1.88, i.e., from 200 microns to 375 microns.)

For the fuel elements to be located about the periphery of the reactor core, it is desired to employ the same uranium dicarbide coated particles, i.e., cores 100 microns in diameter having a 100 micron thick fission product retentive coating. Inasmuch as the loading requirement of these fuel elements is 0.6 gram per cubic centimeter of fuel chamber volume, twice as many coated particles are needed as in the above instance. Thus, the coated fissile particles will occupy 0.202 cubic centimeter of each cubic centimeter of fuel chamber volume. Again applying the packing fraction of 0.6, it is determined that the fertile particles should occupy 0.398 cubic centimeter of each cm.³ of fuel chamber volume.

The same 400 micron diameter thorium dicarbide spheroids are used as the fertile particles, and it is required that 0.9 gram of thorium metal be present in each cubic centimeter of fuel chamber volume. Thus, 0.1125 cubic centimeters of the thorium dicarbide cores should be present in each cm.³ of fuel chamber volume. The difference between 0.1125 cm.³ and 0.398 cm.³ indicates a needed increase to a volume about 3.54 times as large as the volume of the thorium dicarbide cores, which means that the radius of the coated particles should be 1.525 times the radius of the cores. This means the diameter of the fertile coated particles employing the 400 micron diameter cores should be about 610 microns, dictating that a fission product retentive coating 105 microns thick should be applied thereto.

Thus, by coating the 400 micron thorium dicarbide spheroids with a 175 micron thick fission product retentive coating for the fuel elements to be employed near the center of the reactor core and with a 105 micron thick coating for the fuel elements to be located near the periphery of the core, it can be seen that fuel elements of significantly different nuclear fuel loadings are produced using coated fissile particles of a uniform character and fertile particles with the same core composition and size. Only the thickness of the fission product-retentive coating on the fertile particles need be altered.

In forming the fuel elements, mixtures of the fissile and fertile particles of the above-indicated characteristics are first made to insure that a uniform mechanical dispersion of the fissile and fertile particles is achieved. These particle mixtures are then fed into molds of the desired shape, which molds are vibrated to assure that uniform filling is achieved. After filling to the desired level is accomplished, a suitable binder is injected into the interstices of the packed particle beds in the molds, as for example a mixture of furfural alcohol resin and maleic anhydride with some graphite powder as a filler. After the binder has hardened, the fuel rod is carbonized by heating in an oxygen-free atmosphere to drive off the volatiles from the binder. The fuel rods are then inserted into the fuel chambers in the hexagonal fuel elements, and a carbon plug placed in the top of the chamber to seal the fuel hole. Preparation of the fuel elements in this manner has proved to be quite practical and suitable for production operations.

EXAMPLE II

As an alternative method of production, there are advantages to being able to coat all of the fertile particle cores uniformly with the same thickness fission product-retentive coating, as was done in respect of the fissile particles in Example I. Accordingly, thorium dicarbide spheroids are produced by a process which creates a desired size range distribution in the resultant spheroids, and screening or some like physical separation is performed to create two different batches of spheroids, one having an average diameter of 300 microns and the other having an average diameter of 600 microns. Each of these batches of spheroids is then coated with a fission product retentive pyrolytic carbon coating having a thickness of 150 microns.

To make fuel elements to be disposed in the central portion of the reactor core, reference is made to the loadings specified in Example I and to the calculations set forth hereinbefore with respect thereto. To meet the design criteria, the fertile particles should occupy 0.499 cubic centimeters of each cubic centimeter of fuel chamber volume, and within this 0.499 cubic centimeters there should be present 0.075 cm.$^3$ of the thorium carbide core material. Percentagewise, this means that the overall character of the coated fertile fuel particles should be 15 percent thorium dicarbide and 85 percent coating. The 300 micron average diameter thorium dicarbide cores, which are coated with a 150 micron thick layer of pyrolytic carbon, comprise 12.5 percent thorium dicarbide and 87.5 percent coating material. The 600 micron diameter cores which were coated with the 150 micron thick coating contain 29.7 percent thorium dicarbide and 70.3 percent coating. Algebraically, it is determined that the fertile particles should consist of a mixture of 85.5 volume percent of the smaller 600 micron diameter coated particles and 14.5 percent by volume of the larger 900 micron average diameter coated particles.

For the peripheral fuel elements, using the figures previously determined in Example I, each cubic centimeter of fuel chamber volume should contain 0.1125 cm.$^3$ of the thorium dicarbide core material, and this amount of thorium dicarbide core material should be present in coated particles which occupy 0.398 cm.$^3$. Percentagewise, this means that the coated fertile particles should be about 28.3 percent thorium dicarbide material and 71.7 percent coating material. Algebraically, it is determined that 91.9 volume percent of the total volume of fertile particles should be composed of the larger diameter coated fertile particles and 8.1 volume percent should be composed of the smaller coated fertile particles.

Thus, it can be seen that by the employment of a single group of fissile particles and two different groups of coated fertile particles having the same core composition, but having different average core diameters, nuclear fuel elements can be simply produced having a fairly wide variance in nuclear fuel loading by proper selection of the relative proportions of the groups of fertile particles, without the necessity of tailoring individual fuel particles for each specific fuel element loading.

Various of the features of the invention are set forth in the claims which follow.

What is claimed is:

1. A method of making a plurality of nuclear fuel elements having different nuclear fuel loadings but each having the same fuel chamber volume into which the nuclear fuel is loaded, which method comprises providing minute particulate nuclear fuel cores, coating a first group of said fuel cores which are of an approximately uniform size with a fission-product-retentive coating to provide a first group of coated fuel particles, coating a second group of said cores which are of an approximately uniform size with a fission-product-retentive coating, said second group of coated particles varying from the first group of coated particles either in core composition, core size, or coating thickness and thereby containing a different amount of nuclear fuel per unit volume of coated particles, loading a mixture of coated fuel particles from said first and second groups into one fuel element, the amount of nuclear fuel within said one fuel element being determined by the amount of fuel particles in said mixture from said first group relative to the amount of fuel particles used from said second group, and loading a different amount of nuclear fuel into another fuel element by using a mixture of different relative amounts of said first and second groups of coated nuclear fuel particles.

2. A method in accordance with claim 1 wherein said first group of fuel cores have an average volume significantly larger than the volume of said second group of fuel cores and wherein the fission product-retentive coating applied to both said first and second groups of fuel cores is of approximately the same thickness.

3. A method in accordance with claim 1 wherein said first and second groups of fuel cores have about the same average particle size and wherein the thickness of said fission product-retentive coating applied to said first group of fuel cores is significantly greater than the thickness of said coating applied to said second group of fuel cores.

References Cited

UNITED STATES PATENTS

| | | | |
|---|---|---|---|
| 3,335,063 | 8/1967 | Goeddel et al. | 176—67 |
| 3,298,921 | 1/1967 | Bokros et al. | 176—67 |
| 3,318,695 | 5/1967 | Goslee et al. | 264—.5 |
| 3,488,409 | 1/1970 | Beutler et al. | 264—.5 |
| 3,375,307 | 3/1968 | Blum et al. | 264—.5 |
| 3,147,191 | 9/1964 | Crowther | 176—68 |
| 3,179,571 | 4/1965 | Schabert et al. | 176—68 |
| 3,215,607 | 11/1965 | Lackey | 176—67 |
| 3,274,068 | 9/1966 | Koutz et al. | 264—0.5 |
| 3,413,196 | 11/1968 | Fortescue et al. | 176—73 |

REUBEN EPSTEIN, Primary Examiner

U.S. Cl. X.R.

176—73, 82